(12) United States Patent
Ribero et al.

(10) Patent No.: US 11,667,216 B2
(45) Date of Patent: Jun. 6, 2023

(54) DYNAMIC BACKWARD SEAT SLIDING AFTER IMPACT IN A COMMERCIAL VEHICLE

(71) Applicant: Volvo Truck Corporation, Gothenburg (SE)

(72) Inventors: Raphaël Ribero, Millery (FR); Thomas Partarrieu, Dardilly (FR)

(73) Assignee: Volvo Truck Corporation, Gothenburg (SE)

( * ) Notice: Subject to any disclaimer, the term of this patent is extended or adjusted under 35 U.S.C. 154(b) by 36 days.

(21) Appl. No.: 17/276,140

(22) PCT Filed: Sep. 13, 2018

(86) PCT No.: PCT/EP2018/074777
§ 371 (c)(1),
(2) Date: Mar. 13, 2021

(87) PCT Pub. No.: WO2020/052766
PCT Pub. Date: Mar. 19, 2020

(65) Prior Publication Data
US 2022/0048406 A1 Feb. 17, 2022

(51) Int. Cl.
*B60N 2/02* (2006.01)
*B60R 21/015* (2006.01)
(Continued)

(52) U.S. Cl.
CPC ........... *B60N 2/0276* (2013.01); *B60N 2/002* (2013.01); *B60N 2/4221* (2013.01);
(Continued)

(58) Field of Classification Search
CPC .... B60N 2/0276; B60N 2/002; B60N 2/4221; B60N 2/42736; B60N 2/4279;
(Continued)

(56) References Cited

U.S. PATENT DOCUMENTS

| | | |
|---|---|---|
| 6,385,517 B1 | 5/2002 | Kore |
| 10,011,194 B1 | 7/2018 | Scott et al. |

(Continued)

FOREIGN PATENT DOCUMENTS

| | | |
|---|---|---|
| CN | 108394368 A | 8/2018 |
| CN | 108860130 A | 11/2018 |

(Continued)

OTHER PUBLICATIONS

Non-Final Office Action for U.S. Appl. No. 17/276,141, dated Jun. 27, 2022, 13 pages.
(Continued)

*Primary Examiner* — Paul N Dickson
*Assistant Examiner* — Shams Dhanani
(74) *Attorney, Agent, or Firm* — Withrow & Terranova, PLLC

(57) ABSTRACT

A safety system for a vehicle seat in a commercial vehicle operating a vehicle seat motion actuation when the commercial vehicle is colliding with an obstacle, comprising: —at least one actuator unit that comprises at least one seat actuator to move the vehicle seat from a driving position to a safety position—at least one control unit connected to said actuator unit to control the at least one seat actuator—at least one proximity sensor connected to said control unit and configured to detect an obstacle before the commercial vehicle collides it characterized in that the control unit is provided with a calculator device retrieving specific data (Dw, Dw', Ds, Do) to determine the requested seat's motion speed profile and the requested seat's motion triggering moment to control, upon receiving an imminent and unavoidable collision alert signal from the proximity sensor, the at least one seat actuator to move the vehicle seat to the safety position.

12 Claims, 3 Drawing Sheets

(51) Int. Cl.
  *B60N 2/00* (2006.01)
  *B60N 2/42* (2006.01)
  *B60N 2/427* (2006.01)
  *B60R 21/0132* (2006.01)
  *B60R 21/0134* (2006.01)
  *B60R 21/01* (2006.01)

(52) U.S. Cl.
  CPC ...... *B60N 2/42736* (2013.01); *B60R 21/0132* (2013.01); *B60R 21/0134* (2013.01); *B60R 21/01512* (2014.10); *B60R 2021/01252* (2013.01)

(58) Field of Classification Search
  CPC ............ B60R 21/0132; B60R 21/0134; B60R 21/01512; B60R 2021/01252
  See application file for complete search history.

(56) References Cited

U.S. PATENT DOCUMENTS

| | | | |
|---|---|---|---|
| 10,518,674 B1 | 12/2019 | Aikin et al. | |
| 11,124,143 B1 | 9/2021 | Pertsel | |
| 2004/0212226 A1 | 10/2004 | Bethge et al. | |
| 2005/0065688 A1 | 3/2005 | Rao et al. | |
| 2005/0240329 A1* | 10/2005 | Hirota | B60R 21/0134 |
| | | | 701/41 |
| 2005/0283292 A1* | 12/2005 | Kawato | B60N 2/0276 |
| | | | 701/45 |
| 2007/0080657 A1 | 4/2007 | Gerding et al. | |
| 2007/0185635 A1 | 8/2007 | Mattes et al. | |
| 2012/0089303 A1 | 4/2012 | Freienstein et al. | |
| 2012/0173085 A1 | 7/2012 | Hilberer et al. | |
| 2014/0319895 A1 | 10/2014 | Lange-Mao et al. | |
| 2016/0243963 A1 | 8/2016 | Frommann et al. | |
| 2016/0304004 A1 | 10/2016 | Sandbothe et al. | |
| 2019/0283635 A1 | 9/2019 | Yetukuri et al. | |
| 2020/0062146 A1* | 2/2020 | Freienstein | B60N 2/0276 |
| 2020/0171985 A1* | 6/2020 | Yetukuri | B60N 2/42736 |
| 2022/0048407 A1 | 2/2022 | Ribero et al. | |

FOREIGN PATENT DOCUMENTS

| | | | |
|---|---|---|---|
| DE | 19749838 A1 | 6/1999 | |
| DE | 102006051240 A1 * | 5/2008 | ......... B60N 2/0276 |
| DE | 102006051240 A1 | 5/2008 | |
| DE | 102011108918 A1 | 1/2013 | |
| EP | 1609664 A2 | 6/2005 | |
| WO | 0145985 A1 | 6/2001 | |
| WO | 2011/039789 A1 | 4/2011 | |

OTHER PUBLICATIONS

Examination Report for European Patent Application No. 18769679.4, dated Sep. 19, 2022, 5 pages.
International Search Report and Written Opinion for PCT/EP2018/074777, dated May 17, 2019, 9 pages.
International Search Report and Written Opinion for PCT/EP2018/074780, dated May 7, 2019, 8 pages.
Final Office Action for U.S. Appl. No. 17/276,141, dated Dec. 23, 2022, 11 pages.
Advisory Action, Examiner-Initiated Interview Summary, and AFCP 2.0 Decision for U.S. Appl. No. 17/276,141, dated Mar. 9, 2023, 5 pages.
Notice of Allowance for U.S. Appl. No. 17/275,141, dated Apr. 5, 2023, 9 pages.

\* cited by examiner

DYNAMIC BACKWARD SEAT SLIDING AFTER IMPACT IN A COMMERCIAL VEHICLE

This application is a 35 USC 371 national phase filing of International Application No. PCT/EP2018/074777, filed Sep. 13, 2018, the disclosure of which is incorporated herein by reference in its entirety.

TECHNICAL FIELD

The invention relates to a safety system operating a vehicle seat motion actuation in a commercial vehicle when the vehicle is colliding with an object. The invention also relates to a method for actuating a vehicle seat motion in a commercial vehicle when the vehicle is colliding with an object.

The invention is meant to be applied to commercial vehicles such as heavy-duty vehicles, trucks and buses or any vehicles having a distance between the front bumper and the driver that is less than 100 centimetres.

BACKGROUND

A conventional "pre-crash" passive safety system for vehicles comprises a series of sensors that can detect an imminent crash, informing an ECU, that will alert driver attention or activate actuators. Said actuators can help the driver to prevent impact or prepare to the impact various accessories present on vehicle e.g. air-bag, seat belt pre-tensioning devices . . . .

As it is well known, passive safety systems for vehicles aim reducing consequences for passengers.

Some known safety devices for vehicle seat are described in application WO2011039789. The specific solution proposed in this prior art is only targeting the displacement of the back frame and not the whole seat. The other background presented only applies to passenger cars and not to commercial vehicles such as trucks.

The solution proposed by applicant in this application is specific to the trucks configuration which implies technical specificities in comparison to what is proposed for passenger cars due to the very big differences of the crash sequences between a truck and a passenger car. This is mainly due to the fact that the distance between the front bumper and the driver is dramatically different between a truck and a car: a few dozens of centimetres for a truck and several hundreds of centimetres for passenger cars. This structural and geometrical difference has as a consequence that the time between the impact and the time when driver's body is enduring the deceleration due to the impact is much shorter for a commercial vehicle such as a truck than for a car. It is therefore considered that solutions proposed that are applicable for a car are not applicable for a truck due to the time available to displace the seat in a truck.

Therefore, there is a need for an improved safety system that is able to prepare the seats of a commercial vehicle to act upon the driver and passenger positions during the very early phases after an impact i.e. in a time slot of about 15 milliseconds.

SUMMARY

An object of the invention is to provide a safety system that would enable the driver and passenger seats of a commercial vehicle to have their positions adjusted in a few milliseconds just right after the impact but before the body of the seats 'occupants would start to decelerate i.e. within a time window of about 15 milliseconds.

To that end, according to a first aspect, the invention concerns a safety system for a vehicle seat in a commercial vehicle operating a vehicle seat motion actuation when the commercial vehicle is colliding with an obstacle, the safety system comprising:

- at least one actuator unit that comprises at least one seat actuator to move the vehicle seat from a driving position to a safety position
- at least one control unit connected to said actuator unit to control the at least one seat actuator
- at least one proximity sensor connected to said control unit and configured to detect an obstacle before the commercial vehicle collides it, wherein the control unit is provided with a calculator device retrieving specific data to determine the requested seat's motion speed and the requested seat's motion triggering moment to control, upon receiving an imminent and unavoidable collision alert signal from the proximity sensor the at least one seat actuator to move the vehicle seat to the safety position.

Further, according to the present invention, the safety system's seat's actuator(s) move(s) the vehicle seat before the seat's occupant body suffers the deceleration involved by the collision itself.

In this application we refer to the requested seat's motion triggering moment and the requested speed as those two features are calculated and predetermined by the calculator such that the actuator(s) controls the whole seat's motion a few milliseconds after the impact but at a moment when the deceleration of the vehicle due to the collision has not yet started for the seat occupant's body i.e. in a time slot of about 15 milliseconds.

Advantageously, the at least one seat actuator moves the vehicle seat to the safety position in a time frame of thirty milliseconds or less from the time the unavoidable collision alert signal is sent from the proximity sensor to the control unit.

The seat adjustment occurring a few milliseconds after the impact but before the body starts to decelerate has the benefit to prepare the body to the deceleration involved by the impact by creating a first deceleration step that will put the body in a better situation to welcome the deceleration involved by the impact itself. This position is referred to, in this description, as the safety position.

In other words, the seat's occupant body after the first deceleration step is put into a safer position that will lower the effect of the second deceleration avoiding for instance the head tilt. The head tilting thanks to the present invention is realized in a smoother way during the controlled first body deceleration step realized by the seat movement. Further, creating an artificial deceleration in the very early phase of the crash allows to start using the safety systems (such as safety belt) earlier and thus with better efficiency.

Advantageously, the safety system of the present invention comprises further sensors such as a sensor measuring the seat occupant's weight, a sensor measuring the vehicle speed at the moment of the collision, a sensor measuring the collision speed.

According to the present invention, the calculation of the requested seat's motion speed profile and the right seat's motion triggering moment depend at least on the vehicle speed associated with the collision speed range associated with the seat occupant's weight range. The requested seat's motion speed is calculated such that the seat's occupant body suffers a controlled pre-deceleration and the requested seat's motion triggering moment is calculated such that the controlled pre-deceleration suffered by the seat's occupant body occurs before the deceleration involved by the collision itself. According to a preferred embodiment, the seat motion is a backward seat sliding motion and the safety position corresponds to a specific backward position of the vehicle seat. It has to be noted that for the present invention, when it is referred to a specific backward position it can be at the end backward position of the usual back stroke of the vehicle seat or only at a portion of it that is sufficient for the seat's occupant to receive a first deceleration e.g. only after the seat moved backward along two third of the whole back stroke of the vehicle seat. The specific backward position can also correspond to the end backward position of an additional back stroke (not shown) that would have been built and added on each vehicle seat for the purpose of the present invention or it can also correspond to a position at a portion of this additional back stroke.

According to a preferred embodiment, the seat motion is a backward seat sliding motion. Thus, the body of the seat's occupant receives a first deceleration step realized by the seat backward sliding in such a way that it will lower the effect of the second deceleration step, that second one involved by the impact itself.

Furthermore, the solution proposed enables the determination of the right seat motion speed profile. This has the advantage to offer the possibility to modify the seat deceleration value in order to adapt to the vehicle speed at the moment of the impact so as to match both decelerations (seat and impact decelerations) and keep a manageable delta of deceleration for the seat's occupant's body between the first and the second deceleration.

The system may comprise further sensors such as a sensor measuring the vehicle speed at the moment of the collision, a sensor measuring the collision speed i.e. speed difference between the vehicle speed and the speed of the object to be collided and a sensor measuring the seat's occupant's weight. There can also be provided a sensor that identifies the type of obstacle to be collided (a vehicle, a wall, a tree etc. . . . ). The vehicle speed at the moment of the collision is a relevant data if the commercial vehicle e.g. a truck is to collide with a fix object (which is not always the case). The collision speed can be calculated by the proximity sensor that measures in real time the distance between the truck and the target even if the target is moving. Therefore, thanks to this sensor, it is possible to calculate the delta speed between the commercial vehicle and a moving object that is to be collided. The third data taken into account is the weight of the driver, necessary to adjust the power necessary to move the seat at the right speed.

Therefore, the determination of the right seat motion speed profile and the right triggering moment of the seat's motion according to the present invention depend on the vehicle speed associated with the collision speed range associated with the seat's occupant's weight range. The system is therefore provided with a calculator device that is able to calculate from the data received by the sensors the right seat motion speed profile. The calculator device also ideally combines the data received by the sensors with the vehicle's own data e.g. type of vehicle, tracted load, and type of cab used, to calculate a more accurate requested seat motion speed profile and a more accurate triggering moment of the seat's motion to provoke the most adapted pre-deceleration for the seats' occupants' bodies.

As mentioned above, in a preferred embodiment, the vehicle seat motion is a backward seat sliding motion. This backward sliding motion can further be combined with other seat motions having several degrees of liberty or axis i.e. move the seat down on a vertical axis, adjust the back seat position etc. . . . motions that can increase the efficiency of the body preparation and safety.

According to the present invention, the vehicle seat motion is imparted by an actuator unit that comprises at least one seat actuator that can be a motor of any type (electrical, pneumatic, pyrotechnic, mechanical, hydraulic, . . . ) but adapted so that power and speed against volume enable to have an efficient but not a bulky system. The actuator unit also needs to be able to have the seat prepared and have the full seat motion undertaken in only a few milliseconds (about 15 ms) so that motion of the seat is realised between the moment the imminent and unavoidable collision signal is sent by the proximity sensor and before the deceleration from the crash itself is undergone by the driver's body.

In a preferred embodiment of the present invention, the proximity sensor is an Advanced Emergency Braking System (AEBS). To improve safety, trucks are now equipped with AEBS, including sensors to collect information and a safety electronic control unit to build an alerting signal for the driver in case of a dangerous traffic situation being detected, such as a risk of collision, and to actuate automatically, if necessary, an emergency braking to stop or reduce the speed of the truck before the collision occurs. Using the AEBS to trigger the actuation of the seat motion permits to have a safety system that does not require human intervention to be effective. Indeed, the seat adjustment occurs therefore at a time that is so close to the crash that it would have no benefit to try to steer the vehicle in other directions and braking is already being actuated automatically by the AEBS functionality.

Further, using the AEBS to trigger the actuation of the seat motion permits to have a safety system that does not require human intervention to be effective.

According to a second aspect, the invention concerns a vehicle seat arrangement comprising a passive safety system as previously described.

According to a third aspect, the invention concerns a commercial vehicle comprising at least one seat provided with the vehicle seat arrangement mentioned above. Further, when the obstacle is a front obstacle and when the vehicle is moving forward, the vehicle seat motion triggered by the passive safety system of the present invention is a backward seat sliding motion.

According to a fourth aspect, the invention concerns a method for actuating a vehicle seat motion when the vehicle is colliding with an object, the method comprising the following steps:

the calculator device detects an alert signal that an imminent and unavoidable collision is about to happen from the proximity sensor the calculator device retrieves necessary data from various sensors in the vehicle the calculator device combines the retrieved data with the vehicle's own data the calculator device calculates the requested seat motion's speed and the requested motion's triggering moment the calculator device sends a signal to the seat actuators so that they prepare to move the seat with the requested force and are able to move the seat(s) at the predetermined calculated (i.e. requested) speed to ensure a controlled pre-deceleration of the body of the seat's occupant.

The calculator device calculates the moment of the intended unavoidable impact and sends at that calculated moment a triggering signal to the actuator unit of the actuator so that the whole seat motion is started at the requested moment such that the controlled pre-deceleration suffered by the seat's occupant body occurs before it undergoes the deceleration involved by the collision itself.

According to the present invention, the vehicle seat is moved to the safety position in a time frame of thirty milliseconds or less from the time the unavoidable collision alert signal is sent from the proximity sensor to the control unit.

Therefore according to the present invention, the whole seat motion is started at the exact timing to enable the whole seat being moved backward right after the impact but at a moment when the deceleration of the vehicle due to the collision has not yet started for the seat occupant's body.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 4:
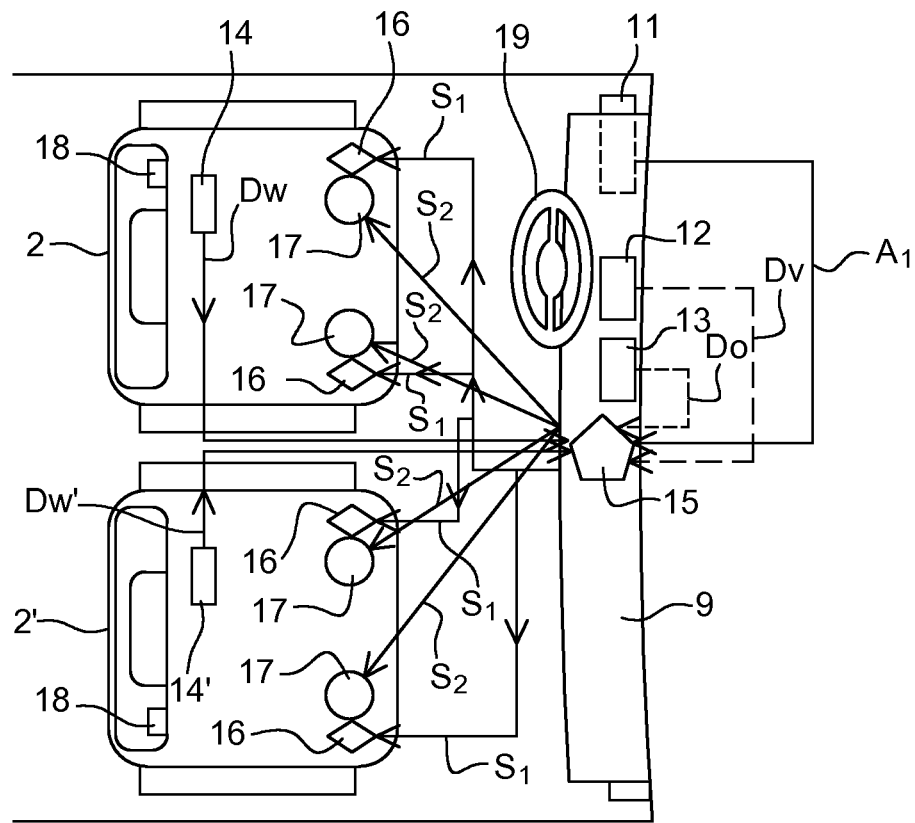
FIG. 4 is a schematic top view of the interior of a vehicle's cab provided with a safety system according to one possible embodiment of the present invention.

Reference to FIG. 4 is made all along the following description in combination with the other figures.

FIGS. 1a to 1d are schematic representations from the side of the seat and its occupant at different moments during the 15 milliseconds in between the impact and the deceleration due to the impact.

Figure 1A:
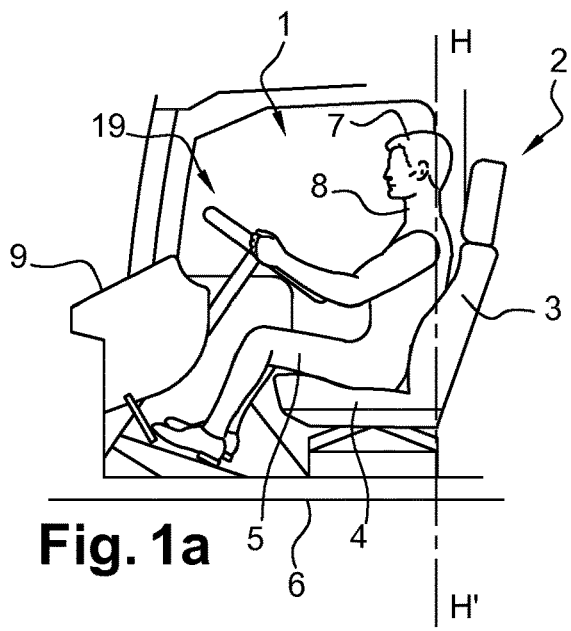
FIG. 1a to 1d are schematic representations from the side of the seat and its occupant at different moment during the 15 milliseconds in between the impact and the deceleration due to the impact.

FIG. 1a shows the seat occupant before the impact.

For the ease of the understanding we will use "driver" to designate the seat's occupant but it has to be understood that it could also be a passenger sitting on a seat provided with the device of the present invention.

In FIG. 1a, seat 2 and driver 1 are in a normal driving position.

The driver 1 is seated in his vehicle seat 2 with his back resting on the back seat 3 that is inclined according to the driver's preferences when driving. The sitting portion 4 of the seat 2 that receives the buttocks and upper thighs 5 of the driver 1 is almost parallel to the ground floor 6 of the vehicle's cab. The head 7 and neck 8 of the driver 1 are in a perfect driving position i.e. aligned along an axis HH' that is almost perpendicular to the ground floor 6 of the vehicle's cab.

This position is the same as the one a few milliseconds before the impact except that a few milliseconds before the impact the seat's actuators 16 (see FIG. 4) are warned by the proximity sensor 11 that a crash is imminent. At that time, the actuators 16 are getting prepared for a quick backward movement but the seat 2 is not yet moving backward in order to let the driver 1 a full control of the vehicle 20 for the longest possible period of time and the ability to use the steering wheel 19 in order to avoid the obstacle for instance.

The seat motion actuators may be for example, electrical actuators where electrical motors will rotate a threaded screw on which the seat is fixed in order to make the seat moving backward. Another type of actuators that can be envisaged for the present invention are pneumatic actuators using a cylinder with a piston equipped with a pressurized chamber in which a high pressure is constantly applied. This high pressure can be released into the piston chamber via a controlled valve making the piston on which the seat is fixed moving quickly along a longitudinal axis (i.e. along the longitudinal direction of the vehicle, in a backwards direction). Another type of actuators to be considered are the pyrotechnic actuators which are similar to the pneumatic actuators except that the piston movement is actuated by an explosion involving a gas dissipation creating a high pressure in the piston chamber ending in the piston on which the seat is fixed move along a longitudinal axis i.e. making the seat move along a longitudinal axis of the vehicle i.e. in a backwards direction. Finally, mechanical actuators could also be used. These ones using a compressed spring that is released via a controlled actuator to push an axle on which the seat is fixed could also enable a quick motion of the seat in a backwards direction.

Figure 1B:
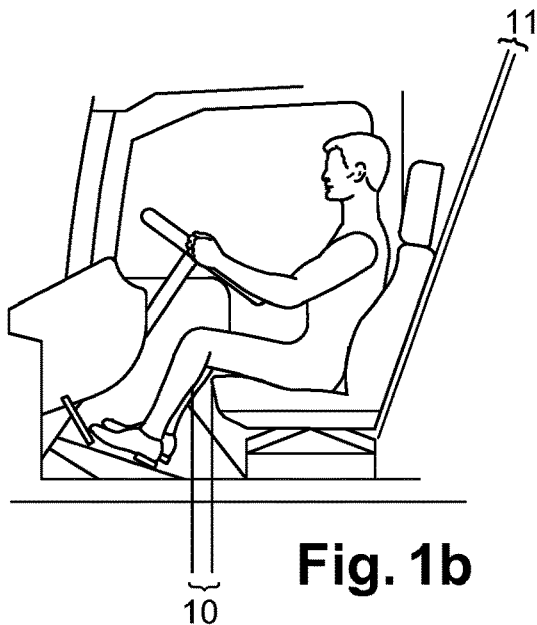

FIG. 1b shows the driver 1 in driving position at the exact moment of the impact. In this figure, it is clearly shown that, at that exact moment of the impact, the body is not experiencing any deceleration. The position is identical to the one of FIG. 1a but the seat 2 is fully ready to start the backward movement. At this time it is useless to still give the possibility for the driver 1 to control the vehicle as the crash has started. The distance between the seat 2 and the dashboard 9 is shown with reference 10, the inclination of the back seat 3 between in the normal driving position and the moment of the impact is shown with reference 11.

Figure 1C:
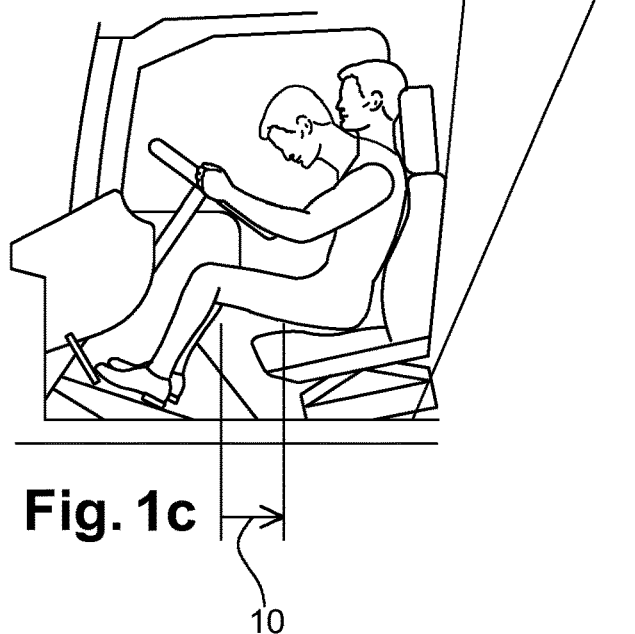
Figure 1D:
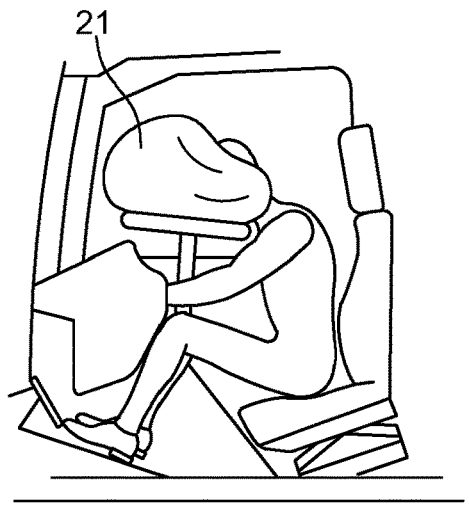

FIG. 1c shows the driver position a few milliseconds after the impact. At that moment, the vehicle's cab is decelerating but the driver's body is not yet experiencing any deceleration caused by the cab. The seat 2 is moving backward (distance 10 is increased) and seats metrics are adjusted to put the driver's body into a position which is adequate to best prepare the driver's body to receive the deceleration due to the impact. The whole seat 2 is suddenly moved backward and the motion of the sitting portion 4 of the seat 2 provokes automatically a tilting of the backrest portion 3 of the seat 2. The backrest portion 3 is after the pre-deceleration almost perpendicular to the ground floor 6 of the vehicle's cab (the inclination of the back seat 3 between in the driving position and a few milliseconds after the impact is shown with reference 11). This fast backward movement combined with the seat's new position also provokes a controlled head tilt (the head and neck are no longer aligned along the axis HH' that is almost perpendicular to the ground floor 6 of the vehicle's cab). An advantage is that the head tilt provoked by the seat movement is much smoother and controlled than if it had been provoked by the crash deceleration itself. FIG. 1c further shows that, after the pre-deceleration, the head has indeed been moved forward and is above the high thighs 5 of the driver 1 nearer to the dashboard 9 and hence to the steering wheel 19 in a position such that when the airbag will deploy there will be no violent head tilting. The lower part of the back of the driver 1 is not resting on the back seat portion 3 of the seat 2 anymore. This pre-deceleration puts therefore the driver into a "deceleration position preparation" that will lower the effect of the much more violent deceleration caused by the effect of the deceleration of the impact itself. Additionally, pre-tensioners 18 are actuated to re-enforce a controlled pre-deceleration.

Advantageously, the intensity of the pre-deceleration can be adjusted so as to match in a better way the second stronger deceleration. In fact the intensity of the deceleration has the effect to have the whole body of the driver 1 put in a shock condition with for instance muscles contracted that has the effect of lowering the harm done to the body by the deceleration due to the impact itself. Therefore in FIG. 1c, the driver 1 is in an optimum position and his body is in the optimum state to endure a deceleration. This is clearly shown in FIG. 1d. Indeed, the body is already decelerating thanks to the seat motion lowering the brutal effect of the deceleration of the cab due to the impact. As can be seen in this figure, due to the deceleration of the cab, the seat 2 is brutally brought forward and airbag 21 is deployed. Thanks to the pre motion of the seat 2 there is no extreme violent seat tilting and hence no violent head tilting.

Figure 2:
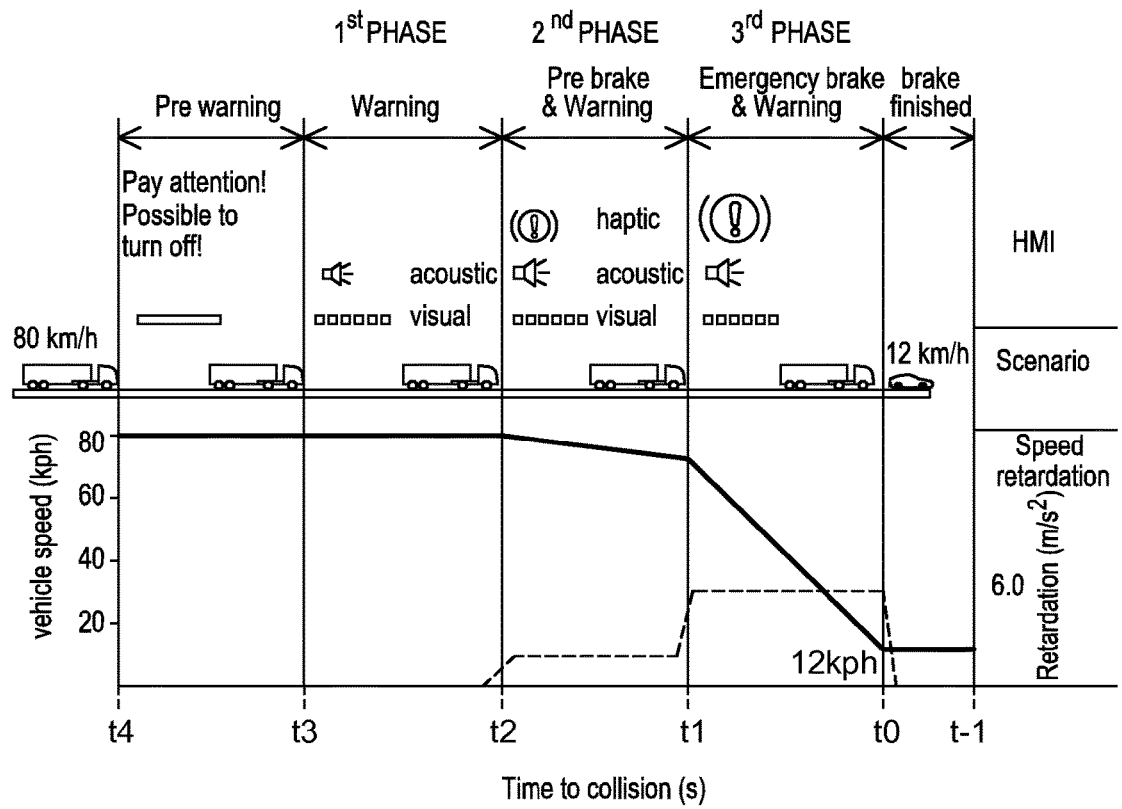
FIG. 2 is a picture showing the different AEBS phases and for each phase there is shown the human machine interface signals sent to the driver, the vehicle speed and the vehicle retardation (i.e. the slowdown of a body movement when this slowdown is the effect of a particular cause).

FIG. 2 is a picture showing the different AEBS phases and for each phase there is shown the human machine interface signals, the vehicle speed and the vehicle retardation.

As mentioned above, in a preferred embodiment of the present invention, the proximity sensor 11 is an Advanced Emergency Braking System (AEBS).

There are three main AEBS phases.

The first phase is initiated when cameras and radars installed on the front part of the truck detect that a collision has a very high probability to happen i.e above 90% risks of a collision to happen so there is still a slight chance to avoid the collision if the driver reacts properly e.g. a steering wheel movement. This first phase is triggering audio and visual alerts to warn the driver that he has to act in order to avoid the collision.

The second phase is initiated when cameras and radars installed on the front part of the truck still detect that the collision has a very high probability to happen meaning that the driver did not take any action to avoid the collision. This second phase does not require a full braking performance, even if it is already applying a strong braking request. This second phase is to lower the vehicle speed (e.g. stop the acceleration and start to slow down the vehicle) and mainly to warn the driver in addition to other audible and visual alerts set preliminary in the first phase.

The third phase is initiated when the collision is imminent e.g. will happen in less than one second, and that the driver did not take any action after phase 1 and 2 (alerts and pre brake) or that the action undertaken by the driver will not suffice to avoid the collision. This third phase requests the maximum braking possibility of the vehicle considering that entering that third phase means an unavoidable collision.

By using the AEBS as a proximity sensor 11 for the safety system of the present invention, this enables to inform the driver and passenger seats 2, 2' prior to a maximum braking performance request. Indeed, the AEBS system usually comprises at least a radar combined with a camera, and can detect an obstacle located at a quite long distance such a few dozens of meters. Therefore, the system can track the object in advance and build a collision's imminence information along the time accumulating data. As long as the object is detected, the system can monitor the delta speed between the truck itself and the object upfront. Knowing the dynamics parameters of the truck (weight, braking possibilities depending on the weight etc. . . . ) the system can be calibrated to determine when a collision becomes unavoidable. A collision is therefore considered unavoidable using a combination of information by the AEBS system such as:
the obstacle speed
the vehicle speed
the difference between the obstacle speed and the vehicle speed
the vehicle's breaking possibilities depending on the weight of the vehicle
the vehicle's breaking possibilities based on the road conditions (temperature, rain and/or ice on the road)
the steering wheel angle
the possible trajectory of the vehicle at each steering wheel angle All these information can be used by the system to determine a certain point in time when the collision cannot be avoided even if the driver will finally turn the steering wheel or if the driver already turns it. The system is therefore able to adjust the alert timing and the braking timing. Combining the safety system of the present invention to such an AEBS offers the possibility to prepare the seat movement when the collision is imminent but only trigger and engage the seat(s) motion when the collision is unavoidable.

Advantageously, the AEBS may comprise further sensors to further help obstacle's detection such as ultrasonic sensors (short range), radars (Miliwaves and Microwaves), lidars, cameras . . . .

The driver and passenger seats 2, 2' will therefore have their positions adjusted thanks to the fact that seat motion actuators 16 have received the information up front, offering the possibility for the seats to get prepared for a quick adjustment just before the impact as detailed above with FIGS. 1a to 1c.

The additional advantage of the present invention is that knowing the collision is imminent and the AEBS system being able to determine a certain point in time when the collision cannot be avoided, it is therefore possible to actuate the seat motion at the requested moment and with the requested speed profile so that the body of the driver 1 receives a first deceleration before it undergoes the deceleration force due to the impact.

Further, it enables to put the body of the driver 1 in the safest possible position to endure a crash without requesting an intervention from the driver 1 i.e. if the driver 1 is unconscious, the system will still be able to position the driver's body in the safety position, better prepared to undergo a crash.

Figure 3:
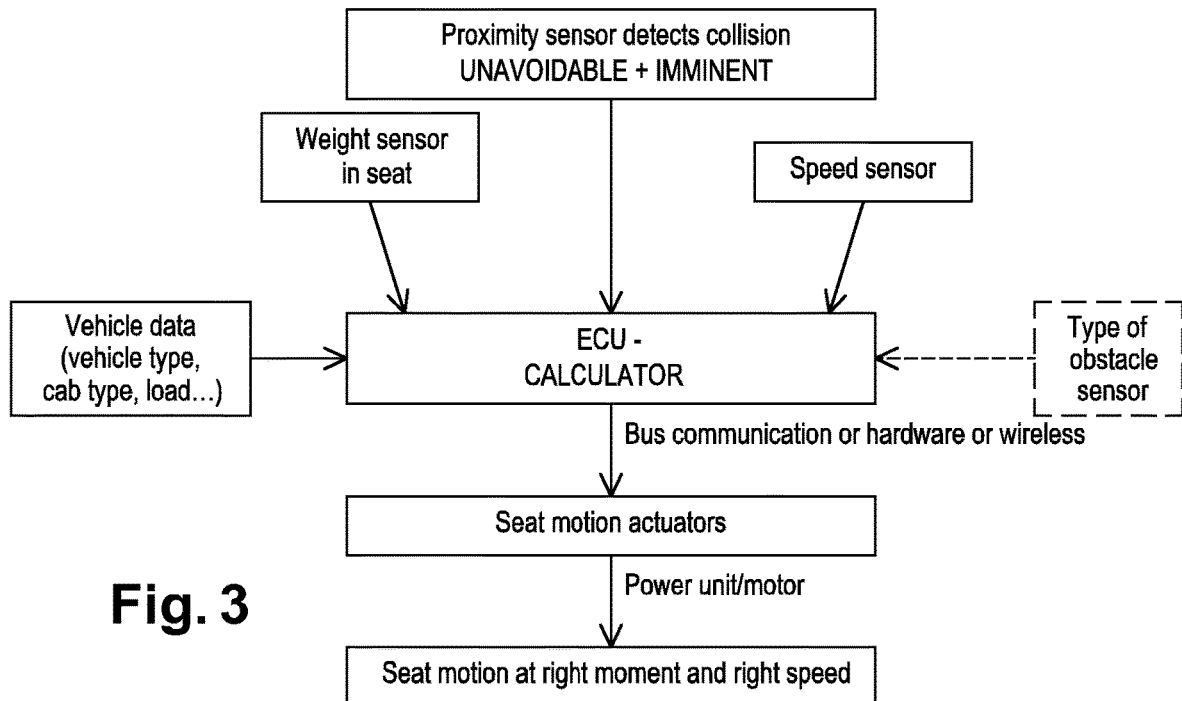
FIG. 3 is a flowchart showing a sequence of operations for the safety device to actuate the vehicle seat motion according to the present invention.

FIG. 3 is a flowchart showing a sequence of operations for the safety device to actuate the vehicle seat motion according to the present invention and FIG. 4 is a schematic top view of the interior of a vehicle's cab provided with a safety system according to one possible embodiment of the present invention. In the following part of the description we will discuss both figures simultaneously.

As mentioned earlier the vehicle 20 is provided with several types of sensors 11, 12, 13, 14 that could be integrated in devices such as a camera or a radar. These sensors 11, 12, 13, 14 collect data that are sent to a specific ECU 15 referred to as a calculator device that is able using many collected data to calculate the right seat motion speed profile and the right moment to trigger the seat motion so that the system enables to position the driver in the safest possible position to undergo a crash, the intensity of the pre-deceleration being adjusted so as to match in a better way the second stronger deceleration.

Once the calculator device 15 has processed the data available, it sends a signal S1 to the seat's actuators 16 using any type of communication means such as a software communication line (BUS) or a hardware communication line (electric impulsions via a wire) or even a wireless communication means.

Once the actuators 16 that are provided with an actuator unit 17 have received the signal S1, they get prepared for a quick motion of the seat(s) 2, 2' at the right force i.e. so that the motion of the seat(s) 2, 2' occurs at the right speed as calculated by the calculator device 15. The calculator device 15 also calculates the right moment to trigger the seat's motion i.e. the calculator 15 is able to calculate, depending on several factors as already mentioned, the moment of the intended unavoidable impact and sends a second signal S2 to the actuator unit(s) 17 of the actuator(s) 16 to trigger the motion of the seat(s) 2, 2' at that calculated moment such that the motion of the seat(s) 2, 2' starts right after the crash but at a moment when the deceleration of the vehicle 20 due to the collision has not yet started for the seat occupant's body.

Therefore, the sequence of operations for the safety device to actuate the vehicle seat motion according to the present invention can be:
  The proximity sensor 11 detects an imminent and unavoidable collision and sends an alert A1 that is detected by the calculator device 15
  The calculator device 15 retrieves necessary data Dv, Do, Dw, Dw' from various sensors 12, 13, 14, 14' in the vehicle i.e. speed sensor, seat's weight sensors, type of obstacles sensor etc . . . .
  The calculator device 15 combines the retrieved data Dv, Do, Dw, Dw' with the vehicle's own data i.e. vehicle type, cab type, tracted load that are either calculated by other ECUs of the vehicle or stored in the vehicle's main ECU's memory and sent to the calculator 15 using any type of communication means such as a software communication line (BUS) or a hardware communication line (electric impulsions via a wire) or even a wireless communication means
  The calculator device 15 calculates the right seat motion's speed and sends a signal S1 to the seat actuators 16 so that they prepare to move the seat with the right force and are able to move the seat(s) 2, 2' at the right calculated speed to ensure a controlled pre-deceleration of the body of the seat's occupant
  The calculator device 15 also calculates the moment of the intended unavoidable impact and sends at that calculated moment a triggering signal S2 to the actuator unit(s) 17 of the actuators 16 so that the whole seat motion is started at the right moment to enable the whole seat being moved backward right after the crash but at a moment when the deceleration of the vehicle due to the collision has not yet started for the seat occupant's body
  At that moment, the calculator device 15 may also actuate the seat belt pretensioners 18 to reinforce a controlled pre-deceleration and decrease the risk of injury to the driver's thorax.

It is to be understood that the present invention is not limited to the embodiments described above and illustrated in the drawings; rather, the skilled person will recognize that many changes and modifications may be made within the scope of the appended claims.

The invention claimed is:

1. A safety system for a vehicle seat in a commercial vehicle operating a vehicle seat motion actuation when the commercial vehicle is colliding with an obstacle, comprising:
   at least one actuator unit that comprises at least one seat actuator to move the vehicle seat from a driving position to a safety position;
   at least one control unit connected to the at least one actuator unit to control the at least one seat actuator; and
   at least one proximity sensor connected to the at least one control unit and configured to detect an obstacle before the commercial vehicle collides;
   wherein the at least one control unit is provided with a calculator device retrieving specific data to determine a motion speed profile and a motion triggering moment to control, upon receiving an imminent and unavoidable collision alert signal from the proximity sensor, the at least one seat actuator to move the vehicle seat to the safety position.

2. The safety system of claim 1 wherein the at least one seat actuator is configured to move the vehicle seat before an occupant body suffers the deceleration involved by the collision itself.

3. The safety system of claim 2 wherein the calculation of the motion speed profile and the motion triggering moment depend at least on the vehicle speed associated with a collision speed range associated with a seat occupant's weight range.

4. The safety system of claim 1 wherein the system comprises further sensors including a sensor measuring a weight of an occupant of the vehicle seat, a sensor measuring the vehicle speed at the moment of the collision, and a sensor measuring the collision speed.

5. The safety system of claim 1 wherein the motion speed profile is calculated such that an occupant suffers a controlled pre-deceleration and the motion triggering moment is calculated such that the controlled pre-deceleration suffered by the occupant occurs before the deceleration involved by the collision itself.

6. The safety system of claim 1 wherein the at least one seat actuator moves the vehicle seat to the safety position in a time frame of thirty milliseconds or less from the time the unavoidable collision alert signal is sent from the proximity sensor to the at least one control unit.

7. The safety system of claim 1 wherein the safety position corresponds to a specific backward position of the vehicle seat.

8. The safety system of claim 1 wherein the at least one seat actuator is a motor that is an electric, a pneumatic, a pyrotechnic, a hydraulic or a mechanic motor.

9. The safety system of claim 1 wherein the proximity sensor is an Advanced Emergency Braking System.

10. The safety system of claim 1 wherein the backward seat sliding motion is combined with other seat movements to adjust metrics of the vehicle seat.

11. A method for actuating a vehicle seat motion in a vehicle provided with a passive safety system, comprising:
   detecting, by a calculator device, an alert signal that an imminent and unavoidable collision is about to happen from a proximity sensor connected to at least one control unit of a vehicle;
   retrieving, by the calculator device, necessary data from various sensors in the vehicle to combine retrieved data with vehicle data;
   calculating a motion speed profile and a motion triggering moment;

sending, by the calculator device, a signal to an actuator to be prepared to move the seat with a force and at a calculated speed to ensure a controlled pre-deceleration of an occupant of the vehicle seat; and sending, by the calculator device, a triggering signal at the calculated moment of the intended unavoidable impact to the actuator unit so that a whole seat motion is started at the calculated moment such that a controlled pre-deceleration suffered by the occupant occurs before the deceleration involved by the collision itself.

12. The method of claim 11 wherein the vehicle seat is moved to a safety position in a time frame of thirty milliseconds or less from the time the unavoidable collision alert signal is sent from the proximity sensor to the at least one control unit.

* * * * *